United States Patent
Greisner (10) Patent No.: US 9,138,765 B2
(45) Date of Patent: Sep. 22, 2015

(54) COATING DEVICE FOR WORKPIECES AND METHOD FOR OPERATING THE COATING DEVICE

(75) Inventor: Uwe Greisner, Reichshof (DE)

(73) Assignee: J. Wagner AG, Altstatten (CH)

( * ) Notice: Subject to any disclaimer, the term of this patent is extended or adjusted under 35 U.S.C. 154(b) by 0 days.

(21) Appl. No.: 13/508,582

(22) PCT Filed: Oct. 1, 2010

(86) PCT No.: PCT/CH2010/000237
§ 371 (c)(1),
(2), (4) Date: Jul. 16, 2012

(87) PCT Pub. No.: WO2011/054115
PCT Pub. Date: May 12, 2011

(65) Prior Publication Data
US 2012/0276288 A1   Nov. 1, 2012

(30) Foreign Application Priority Data
Nov. 9, 2009   (EP) .................................... 09405193

(51) Int. Cl.
*B05C 13/02*   (2006.01)
*B05B 9/00*   (2006.01)
*B05D 1/02*   (2006.01)
*B05D 1/12*   (2006.01)
*B05B 13/02*   (2006.01)
*B05B 15/04*   (2006.01)

(52) U.S. Cl.
CPC ......... *B05B 13/0207* (2013.01); *B05B 13/0214* (2013.01); *B05B 15/04* (2013.01); *B05B 15/0425* (2013.01); *B05C 13/025* (2013.01); *B05B 15/0412* (2013.01); *B05C 13/02* (2013.01)

(58) Field of Classification Search
USPC .......................................................... 427/180
See application file for complete search history.

(56) References Cited

U.S. PATENT DOCUMENTS 3,311,085 A * 3/1967 Smith ............................. 118/59
4,616,594 A   10/1986 Itho
(Continued)

FOREIGN PATENT DOCUMENTS

EP   1 862 592 A2   12/2007
FR   2 722 059 A1   1/1996

OTHER PUBLICATIONS

International Search Report for corresponding International Application No. PCT/CH2010/000237 mailed Dec. 2, 2010.
(Continued)

*Primary Examiner* — Dah-Wei D Yuan
*Assistant Examiner* — Jethro M Pence
(74) *Attorney, Agent, or Firm* — Renner, Otto, Boisselle & Sklar, LLP (57) ABSTRACT

The coating device according to the invention for a workpiece comprises a flow channel which has an opening for the workpiece, through which the workpiece protrudes at least partially into the interior of the flow channel during the coating. In addition, a spraying device is provided, which is arranged in such a way that coating material can be sprayed into the interior of the flow channel by means of the spraying device. Furthermore, the coating device comprises a flow generator, which is arranged and can be operated in such a way that the flow generator produces in the flow channel a flow (L1, L2) directed in the longitudinal direction (LA) of the flow channel.

13 Claims, 7 Drawing Sheets

(56) References Cited

U.S. PATENT DOCUMENTS

| | | | | |
|---|---|---|---|---|
| 4,703,713 | A * | 11/1987 | Gago et al. | 118/19 |
| 6,699,324 | B1 * | 3/2004 | Berdin et al. | 118/306 |
| 2007/0231499 | A1 * | 10/2007 | Worsham et al. | 427/458 |
| 2008/0087217 | A1 * | 4/2008 | Yudasaka | 118/313 |

OTHER PUBLICATIONS

European Search Report for corresponding European Application No. 09405193.5 dated Mar. 25, 2010.

* cited by examiner

COATING DEVICE FOR WORKPIECES AND METHOD FOR OPERATING THE COATING DEVICE

TECHNICAL FIELD

The invention relates to a coating device for workpieces and to a method for operating the coating device.

Powder or paint is used as the coating material to coat the workpiece.

In order to coat a workpiece, such as a metallic pipe, for example, with powder, the powder is sprayed onto the workpiece using one or more powder spray guns. To ensure that the powder adheres better to the workpiece, the powder may be electrostatically charged. The workpiece is subsequently heated in a furnace, whereby the powder is liquefied. The powder then hardens and forms a closed cover on the workpiece. The workpiece is finally cooled down again.

In order to coat a workpiece with paint, the paint is sprayed onto the workpiece using one or more spray guns. In order to improve the adhesion of the pain on the workpiece, the paint, as with the powder, can be electrostatically charged. The workpiece is subsequently heated in a furnace, whereby the diluent escapes from the paint and the paint dries. The paint cures in the process and forms a closed cover on the workpiece.

DESCRIPTION OF THE RELATED ART

However, if only a certain region of the workpiece is to be coated, special measures are required.

A device for suctioning off certain surface regions on powder-coated vehicle wheels is known from the published prior art DE 102 49 999 B3. The device is to be used, after powder-coating vehicle wheels, to fully automatically remove powder again from those surface regions on which no paint is desired. The device comprises a conveyor system, which carries the vehicle wheels through the device, and an electronic camera, which is used to record the axial and angular positions of the vehicle wheels in a recording station. Moreover, a suction station comprising a movable suction head with multiple suction nozzles is provided. By means of a movement device, the suction head can be guided in various axial orientations and in various angular positions about the axis thereof to the powder-coated surface of a vehicle wheel located in the suction station and be moved in this position a certain distance at the speed of the vehicle wheel. Moreover, a vacuum source is provided, which is connected to the suction nozzles. A controller is used to pass the data determined in the recording station for the axial and angular positions of a particular vehicle wheel to the movement device of the suction head with a time delay corresponding to the time it takes the vehicle wheel to pass between the recording station and the suction station, and the controller is further used to prompt the movement device to guide the suction head with a corresponding orientation of the axis thereof and angular position thereof to the vehicle wheel and to move therewith over a certain distance. However, this device has the disadvantage that it is difficult to produce and complex in terms of the technology thereof.

A method and a device for powder-coating select regions of an article, such as a container bottom, for example, is known from the prior published art DE 25 40 993 A1. The device comprises a spray device for injecting air and electrically charged powder particles through a spray chamber onto the container bottom to be coated, which is located outside the spray chamber. Moreover, a masking chamber is provided, which is arranged between the outlet-side opening of the spray chamber and the container bottom to be coated and which surrounds the outlet-side opening of the spray chamber in an annular manner. Using the masking chamber, in which a vacuum is present, the side walls of the container are to be protected from contact with the powder particles.

DESCRIPTION OF THE INVENTION

It is an object of the invention to provide a coating device for workpieces by means of which a certain region of the workpiece can be coated with a delimitation boundary having the most pronounced edges possible. This means that the transition region between the coated and uncoated regions should be as narrow as possible. The coating device should in particular not require a cover mask, and the subsequent blowing-off of the region to be kept free of the coating powder is to be avoided.

The object is achieved by a coating device for workpieces having the characteristics according to claim 1.

The coating device for a workpiece according to the invention comprises a flow channel which has an opening for the workpiece, through which the workpiece protrudes at least partially into the interior of the flow channel during coating. Moreover, a spraying device is provided, which is arranged such that it can be used to spray coating material in the interior of the flow channel. The coating device additionally comprises a flow generator, which is arranged and can be operated such that it generates, in the flow channel, a flow that is directed in the longitudinal direction of the flow channel.

Advantageous refinements of the invention will be apparent from the characteristics provided in the dependent claims.

In one embodiment of the coating device according to the invention, the flow channel has a lateral opening through which the spraying device protrudes into the interior of the flow channel. Because only a part of the spraying device protrudes into the interior of the flow channel, the part of the spraying device located outside the flow channel remains substantially free of coating material, and the cleaning effort is reduced. Moreover, the influence of the spraying device on the course of the flow in the flow channel is reduced. In a further embodiment of the coating device according to the invention, the opening for the workpiece is located at the end face of the flow channel.

In a refinement of the coating device according to the invention, the flow generator, as seen looking in the flow direction, is arranged downstream of the spraying device. In the region in which the coating material cloud is located, thus even more uniform, which is to say more laminar, flow is attained. As a result, no air is blown in the direction of the coating material cloud, but instead the air is removed by suction.

In a further refinement of the coating device according to the invention, a further spraying device is provided, which is arranged such that it can be used to spray coating material in the interior of the flow channel. The workpiece can thus be coated simultaneously on several sides.

Moreover, it is advantageous for the flow channel in the coating device according to the invention to be oriented such that the longitudinal axis of the channel is vertical. In addition to the flow, gravity is thus used to generate a directional, spatially precisely delimited coating material cloud.

So as to achieve the object, according to the invention the flow generator of the coating device according to the invention moreover comprises an air jet pump. The air jet pump has a particularly simple design, contains no moving components and exhibits particularly low wear.

According to a further characteristic of the coating device according to the invention, the flow generator comprises a fan. The fan has the advantage of having high efficiency.

Moreover, a grate may be provided in the coating device according to the invention, the spraying device being arranged above the grate and the fan being arranged below the grate.

As seen looking in the flow direction, a filter may be provided upstream of the fan in the coating device according to the invention. This allows the sprayed powder not adhering to the workpiece to be collected and optionally reused.

It is further advantageous to provide a robot in the coating device according to the invention, the robot holding and guiding the spraying device.

In addition, a robot which holds and guides the workpiece may be provided in the coating device according to the invention.

According to a further embodiment of the coating device according to the invention, the flow channel has a round cross-section. Only small amounts of coating material are thus deposited on the wall of the flow channel, allowing the flow channel to be cleaned easily and quickly.

In a refinement of the coating device according to the invention, the flow channel is made of metal or plastic material. Producing the flow channel from plastic material has the advantage that electrically charged coating particles are not attracted by the flow channel and do not adhere to the inside thereof. A flow channel produced from metal can create deliberate shielding.

Moreover, it is advantageous for the spraying device in the coating device according to the invention to be arranged substantially transversely to the longitudinal axis of the flow channel.

The method according to the invention for operating the aforementioned coating device comprises the following steps. At least the region of the workpiece which is to be coated is inserted in the flow channel. An air flow is generated in the flow channel by means of the flow generator, and a coating material cloud is generated by means of the spraying device so as to coat the workpiece.

Finally, the coating device according to the invention can be used to coat workpieces with coating powder or paint.

BRIEF DESCRIPTION OF THE FIGURES

The invention will be described in more detail hereafter with reference to several exemplary embodiments based on nine figures.

DETAILED DESCRIPTION OF THE INVENTION

The coating device according to the invention is suitable for coating a workpiece with various coating materials, such as powder or paint, for example.

Figure 1:
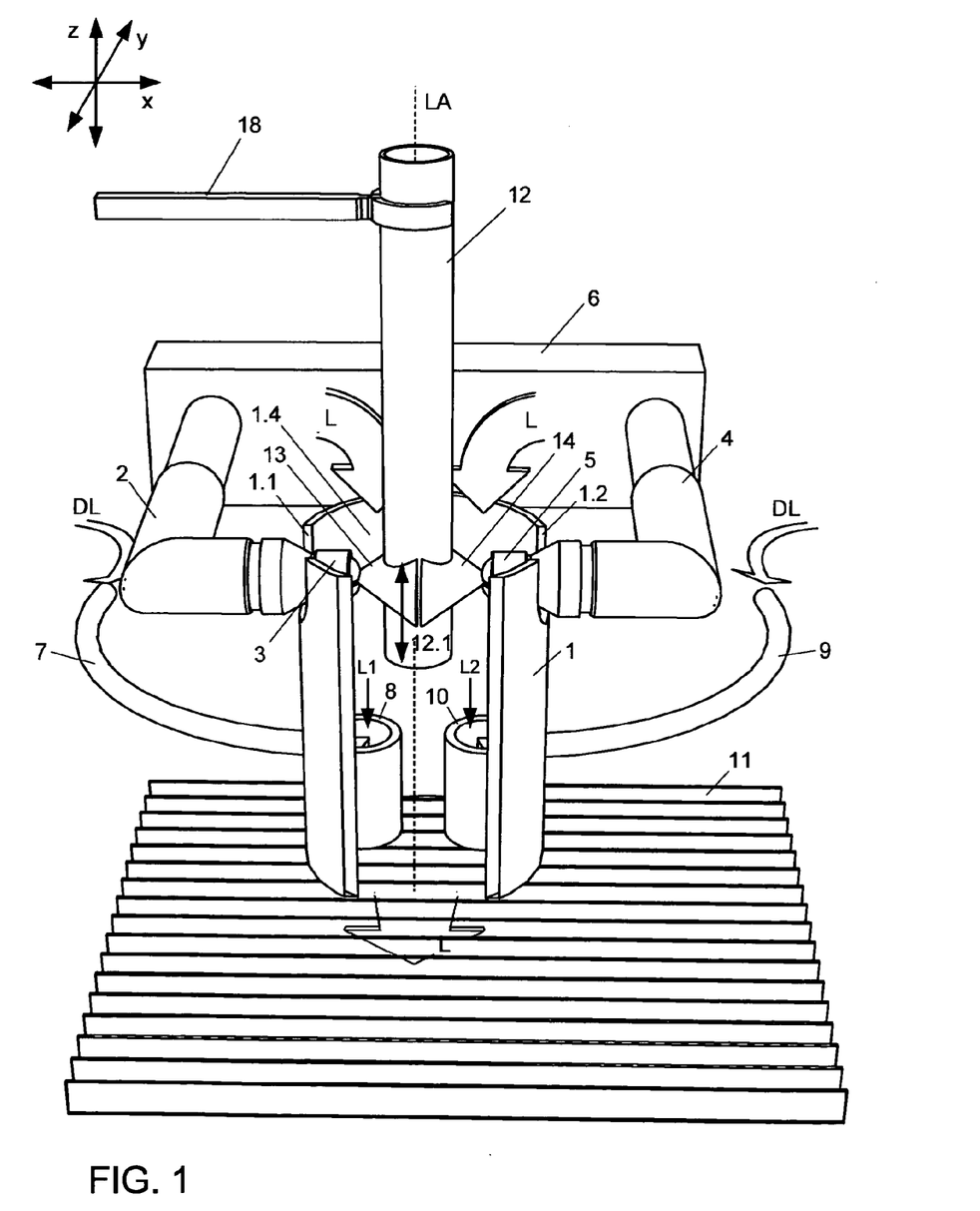
FIG. 1 shows a three-dimensional sectional view of a first embodiment of the coating device according to the invention.
Figure 2:
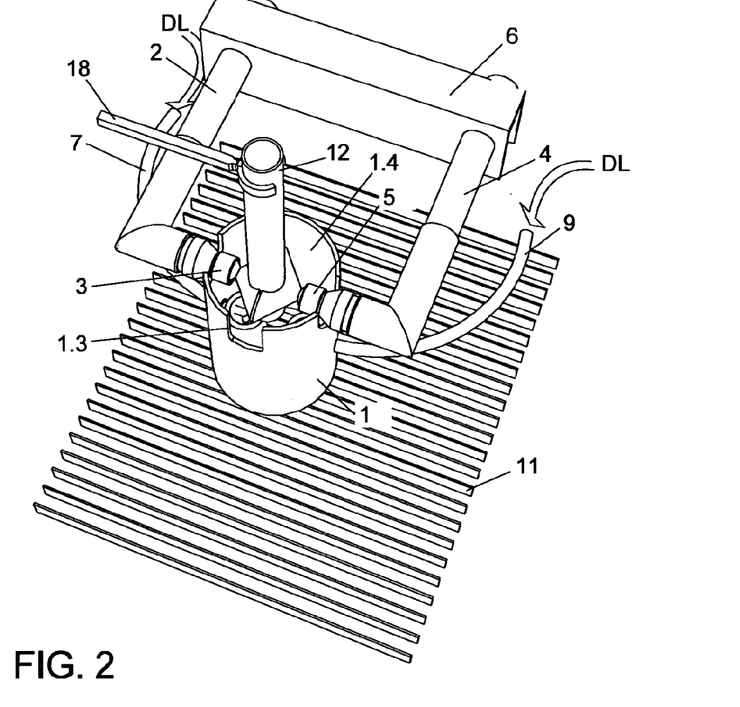
FIG. 2 shows a three-dimensional oblique view from above of the first embodiment of the coating device according to the invention.
Figure 3:
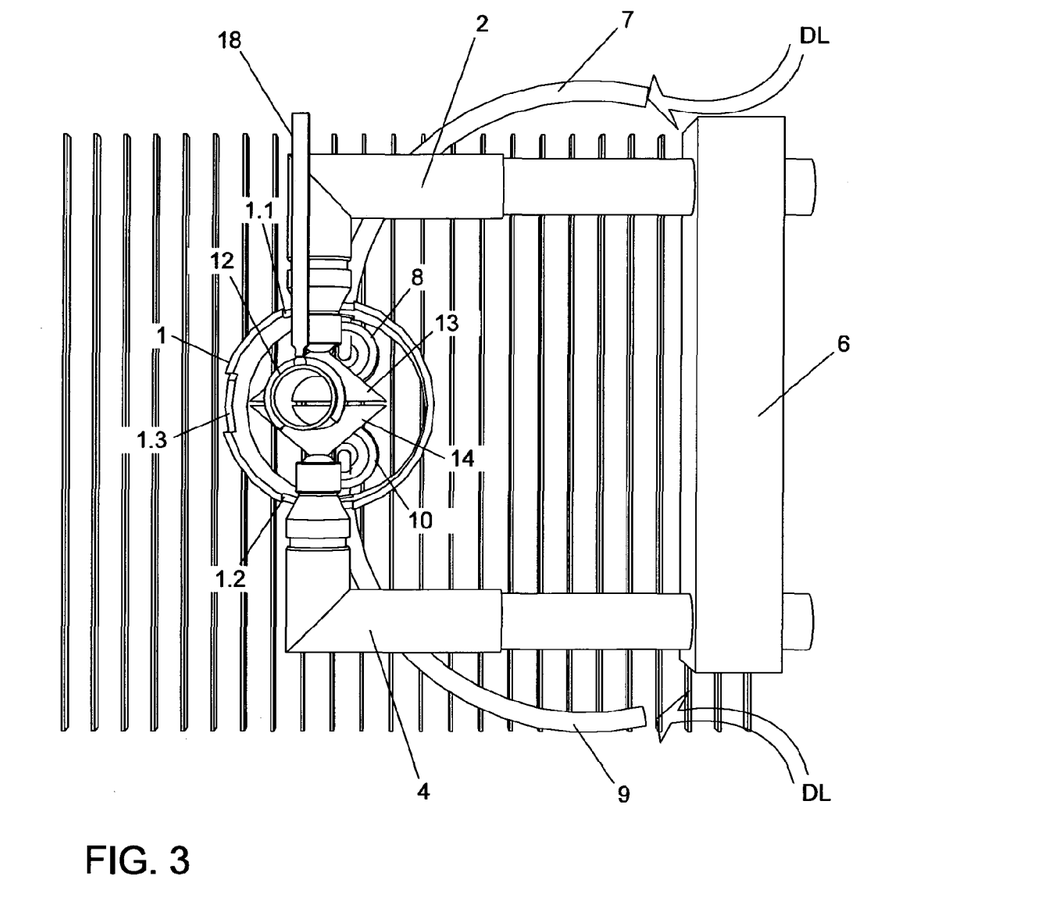
FIG. 3 shows a three-dimensional view from above of the first embodiment of the coating device according to the invention.

FIG. 1 shows a three-dimensional sectional view from the front of a first embodiment of the coating device according to the invention. FIG. 2 shows a three-dimensional oblique frontal view from above of the first embodiment of the coating device according to the invention. FIG. 3 finally shows a three-dimensional view from perpendicularly above of the first embodiment of the coating device according to the invention. The coating device comprises a flow channel 1, which is shown in a sectional view in FIG. 1. The flow channel 1 has the shape of a pipe and is oriented perpendicularly, which is to say vertically. The longitudinal axis of the flow channel is denoted by LA. In the upper region, the flow channel 1 has a first lateral opening 1.1, a second lateral opening 1.2 and a third lateral opening 1.3. The latter is not visible in FIG. 1 because of the sectional representation and is depicted only in FIGS. 2 and 3.

Part of a first spraying device 2 protrudes through the first lateral opening 1.1 into the interior of the flow channel 1, and part of a second spraying device 4 protrudes through the second lateral opening 1.2 into the interior of the flow channel 1.

The two spraying devices 2 and 4 are held by means of a common mounting 6 such that the respective spray nozzles 3 and 5 thereof are located in the interior of the flow channel 1. The mounting 6 can be fastened to an arm of a robot, which is not shown in the figures. The spraying devices 2 and 4 can thus be moved relative to the workpiece so as to achieve even better coating.

The shape of the mouths of the spray nozzles 3 and 5 depends on the shape of the workpiece to be coated. In the exemplary embodiment shown in FIGS. 1 to 3, the mouths of the spray nozzles 3 and 5 have a slot shape.

The coating material cloud 13 generated by the first spraying device 2 and the coating material cloud 14 generated by the second spraying device 4 are shown only schematically in the figures. The shape therefore depends, among others things, on the shape of the spray nozzles 3 and 5, the spray pressure, the coating material that is used, and the rate at which the air L flows through the flow channel 1.

A further opening 1.4 is located at the upper end face of the flow channel 1, this opening also being referred to hereinafter as a flow channel inlet. The workpiece 12 to be coated, which is held by means of a mounting 18, protrudes through the opening 1.4 likewise into the interior of the flow channel 1. The mounting 18 can be part of a conveyor system, or the arm of a robot.

A grate 11 is located below the flow channel 1. The flow channel 1 may sit on the grate 11 or be held above the grate 11 at a certain distance from the grate 11. A further opening, which is also referred to as a flow channel outlet, is located at the lower end face of the flow channel 1.

Two air jet pumps 8 and 10 are present in the lower region of the flow channel 1. The first air jet pump 8 is supplied with compressed air DL via a compressed air hose 7 and takes in air L1 from above. The second air jet pump 10 is likewise supplied with compressed air DL via a second compressed air hose 9 and takes in air L2 from above. The two air jet pumps 8 and 10 thus ensure that air L is taken in from above into the flow channel 1 and thus generate a laminar air flow, which runs substantially parallel to the longitudinal axis LA from top to bottom. The air L exits the flow channel 1 at the lower face through the flow channel outlet.

Figure 4:
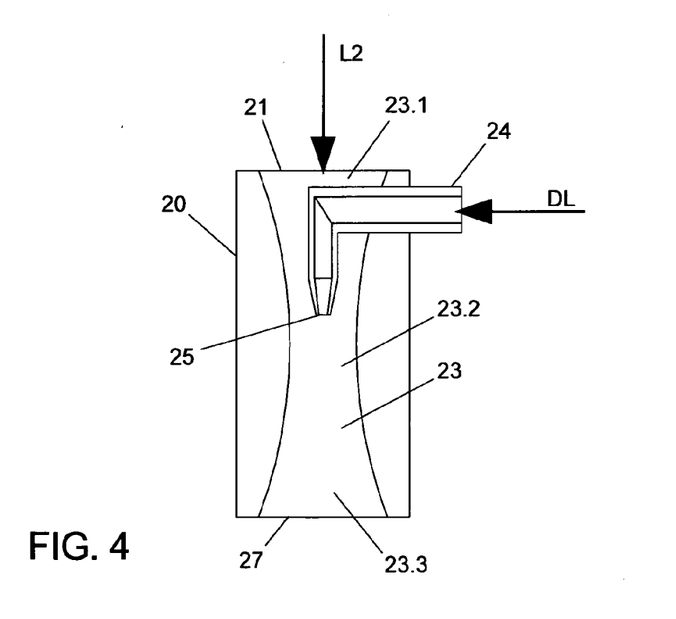
FIG. 4 shows a sectional view of an embodiment of an air jet pump for generating the air flow in the flow channel of the coating device.

FIG. 4 shows an embodiment of the air jet pumps 8 and 10 for generating the air flow L in the flow channel 1 of the coating device. The air jet pumps 8 and 10 operate according to the Venturi principle. The design of the air jet pumps will be described hereafter based on air jet pump 8. However, the same applies similarly to the air jet pump 10. The air jet pump 8 comprises a housing 20 in which a channel 23 is located, which has a larger diameter both in the intake region 23.1 and in the outlet region 23.3 than in the center region 23.2. A compressed air nozzle 25 protrudes into the center region 23.2 of the channel 23, with the compressed air DL being blown through this nozzle in the direction of the outlet region 23.3. Via a line, the compressed air nozzle 25 is connected to a compressed air connection 24 arranged outside the housing 20 and is supplied from there with compressed air DL. The compressed air hose 7 is connected to the compressed air connection 24. A suction action is created by the compressed air DL flowing quickly out of the compressed air nozzle 25, causing the air L2 to be suctioned into the channel 23 through the intake opening 21. A large-volume, yet slowly flowing air flow L2 is thus generated using little, but quickly flowing compressed air DL. An outlet opening 27, through which the air L2 that is taken in and the compressed air DL flow out of the air jet pump, is located at the end of the channel 23.

Figure 5:
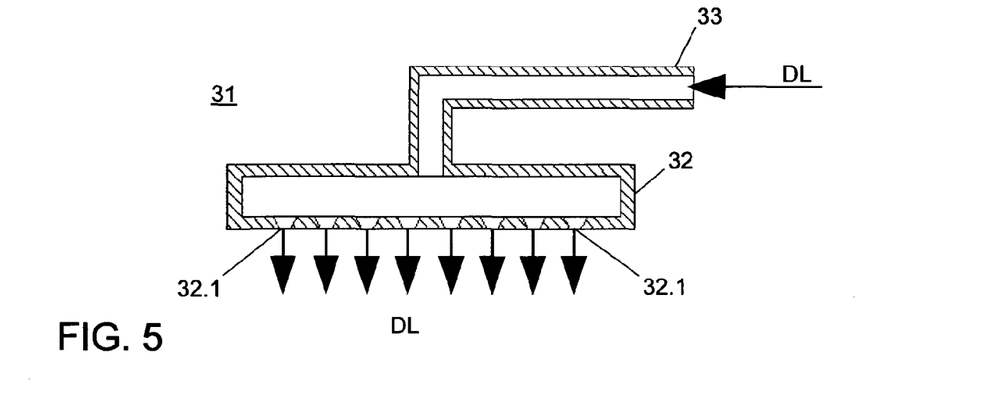
FIG. 5 shows a sectional view of an embodiment of a comb-like compressed air nozzle for generating the air flow in the flow channel of the coating device.

FIG. 5 shows an embodiment of a comb-like air jet pump 31 for generating the air flow L in the flow channel 1 of the coating device. The compressed air nozzle 31 comprises a housing 32, which at the lower face has a plurality of compressed air outlets 32.1 through which the compressed air DL flows out. A corresponding number of downwardly directed compressed air flows are thus generated by the plurality of compressed air outlets 32.1, the flows ensuring that a uniform, directional air flow L, which is substantially parallel to the longitudinal axis LA, forms in the interior of the flow channel 1.

Figure 6:
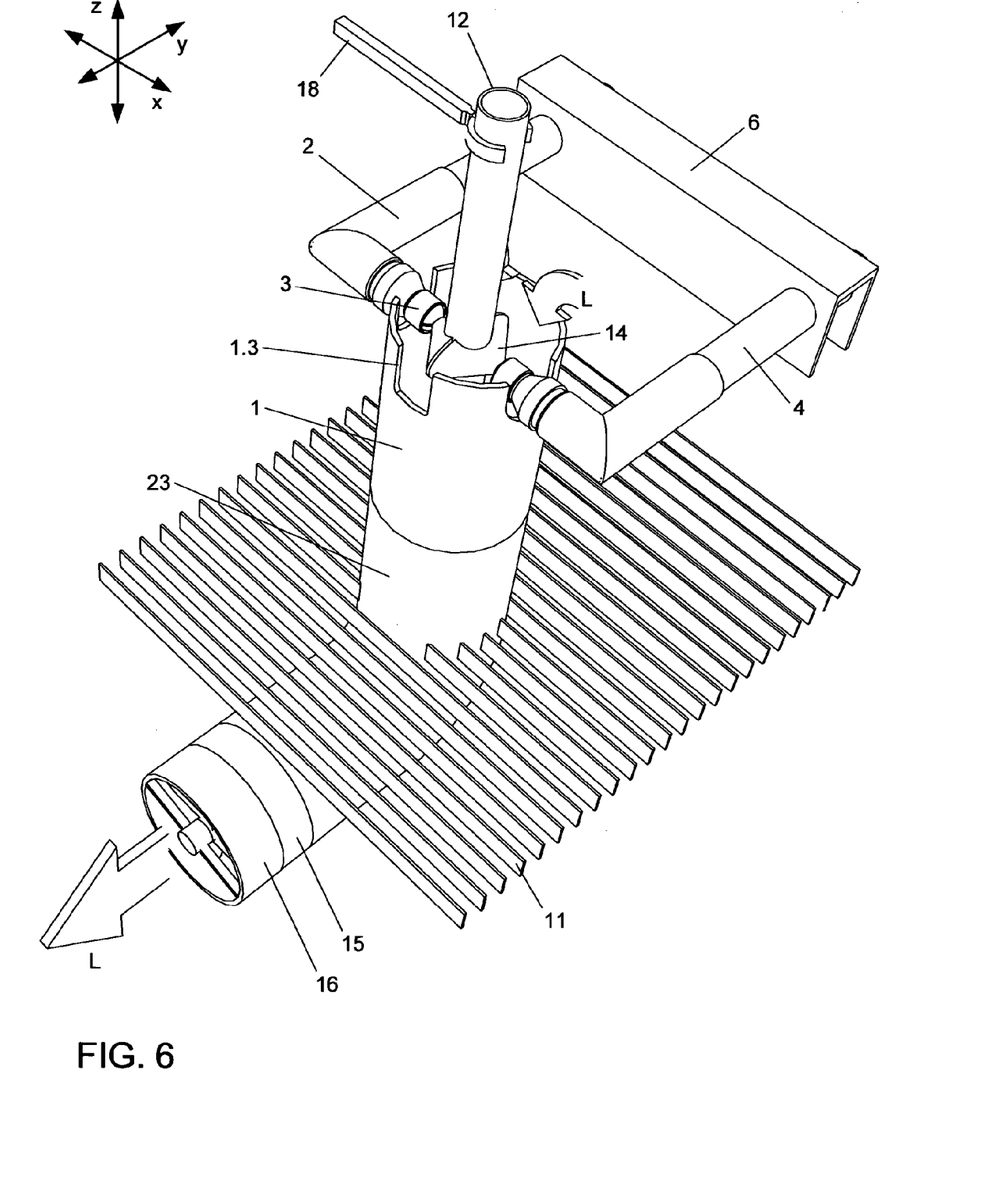
FIG. 6 shows a three-dimensional oblique view from above of a second embodiment of the coating device according to the invention.

FIG. 6 shows a three-dimensional oblique view from above of a second embodiment of the coating device according to the invention. This embodiment differs from the first embodiment in that the flow channel 1 is connected to a filter 15 and a suction fan 16 via a connecting channel 23. Both the filter 15 and the suction fan 16 are arranged below the grate 11. The suction fan 16 is used to generate a vacuum in the connecting channel 23, the vacuum causing the air L to be taken in from above into the flow channel 1. This creates a downwardly directed air flow L in the flow channel 1, the air flow being substantially parallel to the longitudinal axis LA. Those coating material particles which during spraying of the workpiece 12 do not adhere thereto are suctioned, together with the air flow L, into the filter 15, where they are filtered out of the air flow L. The coating material thus recovered can be withdrawn at the lower face of the filter 15 and be recirculated to the spraying devices 2 and 4 as needed. In addition, the second embodiment differs from the first embodiment in that the compressed air lines 7 and 9 protruding laterally into the flow channel 1 are not present.

Figure 7:
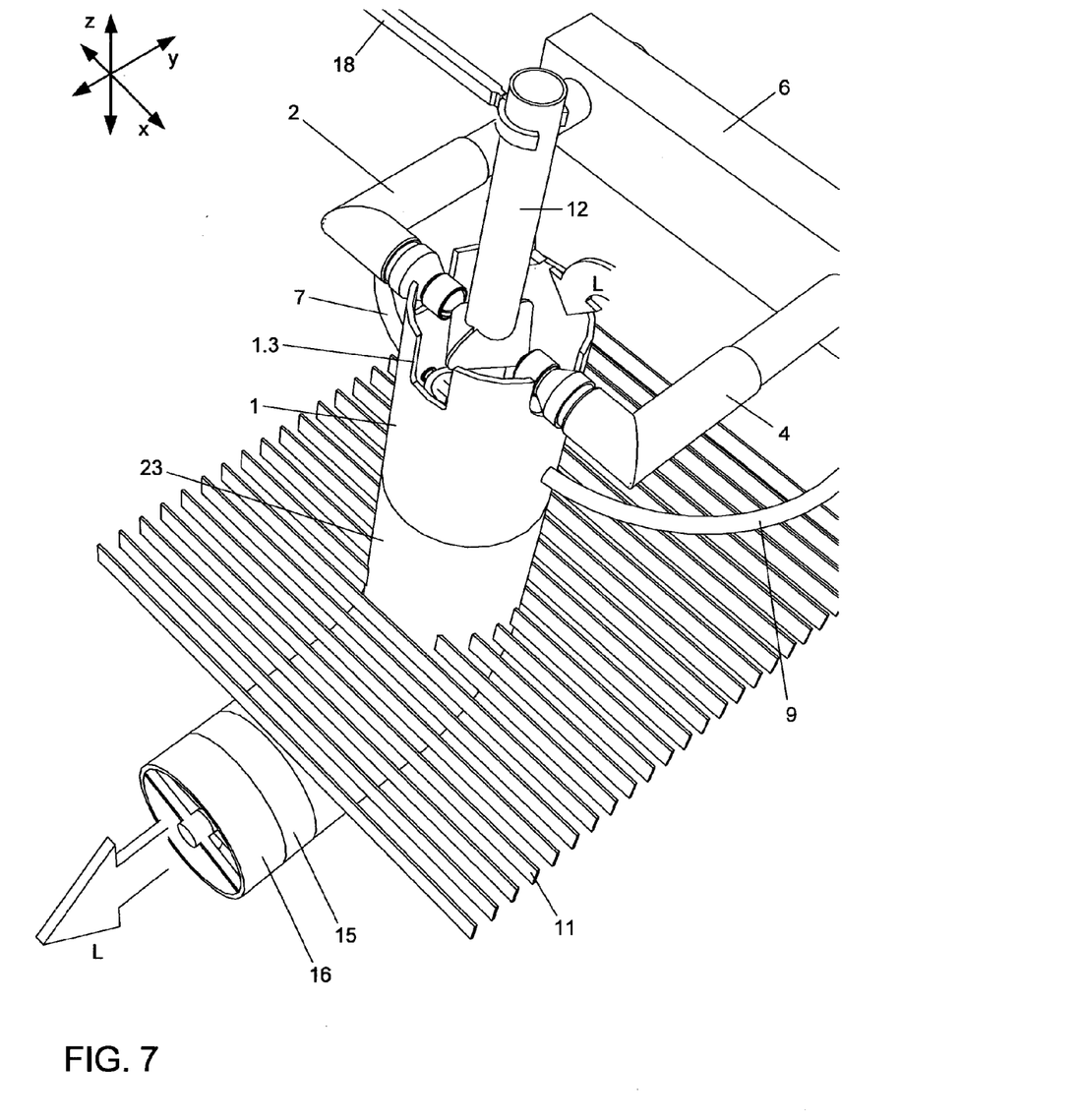
FIG. 7 shows a three-dimensional oblique frontal view from above of a third embodiment of the coating device according to the invention.

FIG. 7 shows a three-dimensional oblique frontal view from above of a third embodiment of the coating device according to the invention. The third embodiment constitutes a combination of the first and second embodiments. The third embodiment thus comprises both the compressed air lines 7 and 9 protruding laterally into the flow channel 1 as well as the associated air jet pumps 8 and 10, and the suction fan 16, the filter 15 and the connecting channel 23.

Figure 8:
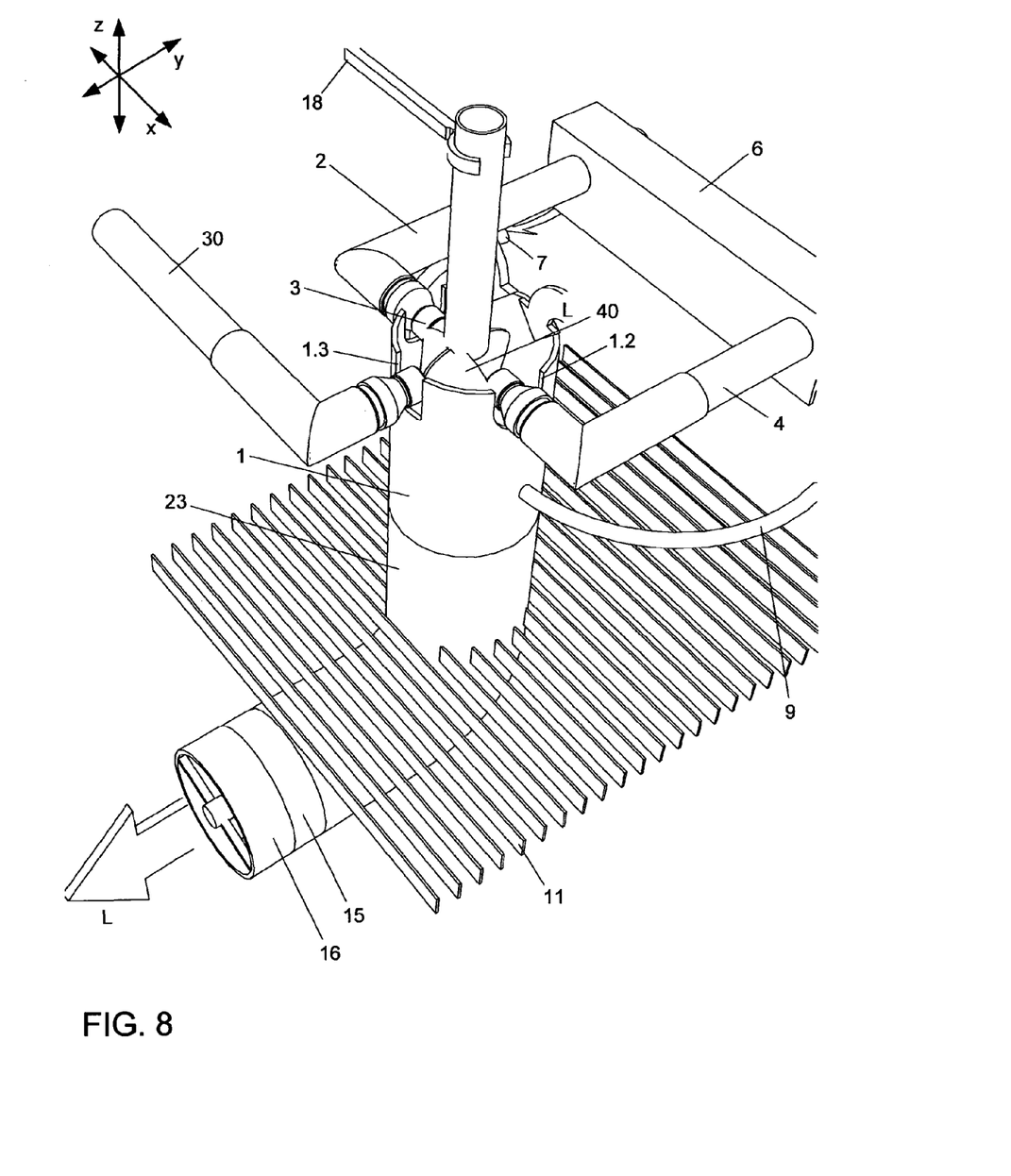
FIG. 8 shows a three-dimensional oblique frontal view from above of a fourth embodiment of the coating device according to the invention.

FIG. 8 shows a three-dimensional oblique frontal view from above of a fourth embodiment of the coating device according to the invention. In addition to the third embodiment, the fourth embodiment has a third spray gun 30, which protrudes into the flow channel 1 through the opening 1.3.

Figure 9:
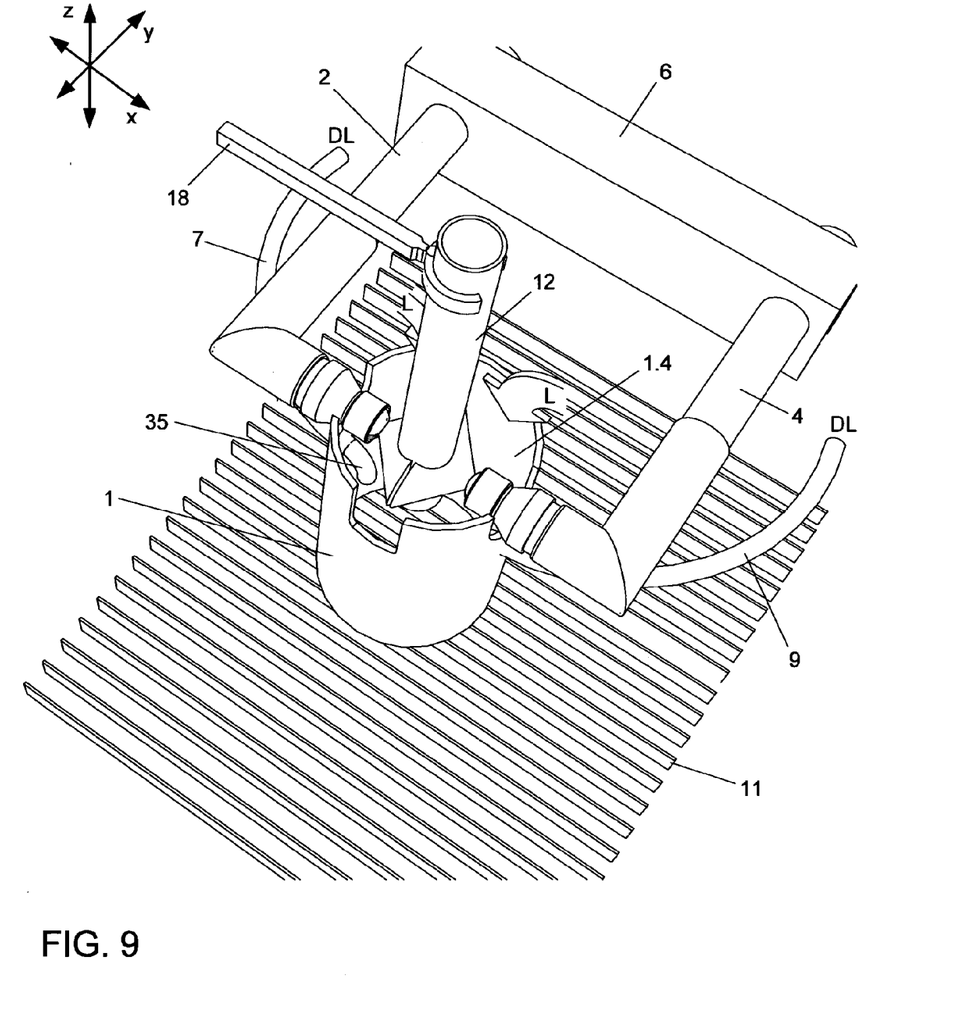
FIG. 9 shows a three-dimensional oblique frontal view from above of a fifth embodiment of the coating device according to the invention.

FIG. 9 shows a three-dimensional oblique frontal view from above of a fifth embodiment of the coating device according to the invention. Here, two nozzles 35 are present in the interior of the flow channel 1, the openings of which point downward, which is to say away from the coating material cloud, whereby the compressed air DL flowing out of the two nozzles 35 generates a downwardly directed air flow L in the flow channel 1. The two nozzles 35 are supplied with compressed air DL via the respective compressed air lines 7 and 9, which can be designed as hose lines, for example. Instead of the two nozzles 35, it is also possible to use two of the comb-like compressed air nozzles 31 shown in FIG. 5.

It is also possible to use spraying devices 2, 4 and 30 which comprise spray guns in conjunction with finger-shaped spray nozzles. Advantageously, as few components of the spraying devices 2, 4 and 30 as possible protrude into the interior of the flow channel 1 because then the influence of the spraying devices 2, 4 and 30 on the air flow L is reduced and fewer components are exposed to soiling by coating material.

In the embodiments of the coating device depicted in FIGS. 1 to 9, the flow channel 1 is oriented such that the longitudinal axis LA thereof is vertical. In addition to the air flow L, gravity is thus used to generate a directional, spatially precisely delimited coating material cloud. However, it is also possible to orient the flow channel 1 horizontally, for example.

The flow channel 1 may also be composed of several parts. In some circumstances it may be helpful for two pipe halves to form the flow channel 1, which are joined during the coating process. For cleaning purposes, the two pipe halves can then be mutually spaced. Instead of inserting the workpiece 12 into the flow channel 1, it is also possible, after the workpiece to be coated has been positioned, to guide the two pipe halves to the workpiece from two sides such that they enclose the workpiece sufficiently far.

A possible operating method will be described hereafter. So as to coat the workpiece 12, the region 40 of the workpiece 12 which is to be coated is inserted in the flow channel 1. An air current L is generated in the flow channel 1 by means of the flow generator, which comprises the air jet pumps 8 and 10 and/or the comb-like compressed air nozzles 31 and/or the compressed air nozzles 35. Thereafter, a coating material cloud 13, 14, 40 is generated by means of the spraying device 2 and/or 4 and/or 30 so as to coat the workpiece 1. The aforementioned steps can be carried out in any arbitrary order. However, in some circumstances it may be useful to carry out the steps in the order described above to save material.

A coating material cloud is generated by the coating device, the cloud having a defined, clearly delimited boundary on one side. The coating material cloud is generally delimited in the most pronounced manner on the side thereof facing the inlet side 1.4 of the flow channel 1. Once the coating material cloud impinges on the workpiece, the most pronounced transition between coated and uncoated workpiece surfaces is obtained where the coating material cloud has the most pronounced boundary. A coating boundary denotes a transition zone on the workpiece 12 in which a coated region transitions into an uncoated region. In the embodiment shown in FIG. 1, the coating material clouds 13 and 14 generated by the coating device are thus clearly delimited toward the top. If the embodiment of the coating device shown in FIG. 1 were not vertically oriented, but horizontally oriented, the coating material clouds 13 and 14 generated by the coating device would be clearly delimited to the side.

If the region 12.1 of the workpiece 12 which is to be coated is so large that the regions that can be covered by the coating material clouds are too small, the workpiece 12 is first coated in the region in which the coating boundary desired on the workpiece 12 is to be located. Subsequently, the workpiece 12 is moved such that thereafter the remaining region to be coated is located in the range of coverage of the spraying devices 2, 4 and/or 30 and can be coated. With the positioning of the workpiece 12 shown in FIG. 1, thus the upper region of the workpiece 12 is coated first by the two spraying devices 2 and 4. The upper boundary of this upper region is the desired coating boundary. The workpiece 12 should not be coated above this boundary.

However, instead it is also possible to first coat the workpiece 12 in the lower region and then to guide the workpiece 12 further into the flow channel 1 so as to then coat it to the desired coating boundary.

At the end of the coating process, the workpiece 12 is transported to the next processing station, for example a furnace.

The faster the air flow L flows in the interior of the flow channel 1, the greater is the amount of coating material which is deflected by the air flow. For the embodiments shown in FIGS. 1 to 9, this means that more coating material is deflected downward. The rate at which the coating material exits the mouth of the spray nozzle, for example spray nozzle 3, also influences the deflection of the material. The higher the material spray rate, the lower is the downward deflection thereof. The optimal adjustment of the flow rate of the air flow L and of the material spray rate depends, among other things, on the shape of the flow channel, the size of the coating particles, the spray nozzle shape that is used, and the geometry of the workpiece to be coated.

The above description of the exemplary embodiments according to the present invention serves only illustrative purposes and is not intended to restrict the invention. Within the context of the invention, various changes and modifications are possible without department from the scope of the invention or the equivalents thereof. For example, the various components shown in FIGS. 1 to 9 can also be combined with each other in a manner which is different from that is shown in the figures. Moreover, for example, a larger or smaller number than two air jet pumps, and a larger or smaller number than two of the comb-like compressed air nozzles, may be used.

List of Reference Numerals and Signs
1 Flow channel
1.1 Opening
1.2 Opening
1.3 Opening
1.4 End-face opening in flow channel
2 Spray gun
3 Spray nozzle
4 Spray gun
5 Spray nozzle
6 Gun mounting
7 Compressed air line
8 Air jet pump
9 Compressed air line
10 Air jet pump
11 Grate
12 Workpiece
12.1 Region of the workpiece which is to be coated
13 Spray jet cloud
14 Spray jet cloud
15 Filter
16 Fan
18 Gripper
20 Housing
21 Intake opening
23 Channel
23.1 Intake region
23.2 Center region of channel
23.3 Outlet region
24 Compressed air connection
25 Compressed air nozzle
27 Outlet opening
30 Spray gun
31 Comb-like compressed air nozzle
32 Housing
32.1 Compressed air outlet
33 Compressed air connection
35 Compressed air nozzle
40 Spray jet cloud
L Air taken in or air flow
L1 Air taken in
L2 Air taken in
DL Compressed air
LA Longitudinal axis

The invention claimed is:

1. A coating device for a workpiece, comprising:
a spraying device,
a tubular flow channel, which has a lateral opening for the spraying device, and a second opening for the workpiece through which the workpiece protrudes at least partially into the interior of the flow channel during coating,
a means for electrostatically charging the coating material,
said spraying device is arranged to spray coating material in the interior of the flow channel, wherein a shape of a mouth of said spraying device is configured to correspond to a shape of said workpiece to be coated,
a mounting, which holds said spraying device and with which said spraying device is configured to move relative to the workpiece, and
a flow generator, which is arranged to generate, in the flow channel, a flow directed in a longitudinal direction of the flow channel,
wherein the flow generator, as seen looking in the flow direction, is arranged downstream of the spraying device.

2. The coating device according to claim 1, wherein the spraying device protrudes through the lateral opening into the interior of the flow channel.

3. The coating device according to claim 1, wherein the second opening for the workpiece is located at an end face of the flow channel.

4. A coating device according to claim 1, comprising a further spraying device, which is arranged such that it can be used to spray coating material in the interior of the flow channel.

5. A coating device according to claim 1, wherein the flow channel is oriented such that the longitudinal axis thereof is vertical.

6. A coating device according to claim 1, wherein the flow generator comprises an air jet pump.

7. A coating device according to claim 1, wherein the flow generator comprises a fan.

8. The coating device according to claim 7, comprising a grate, the spraying device being arranged above the grate and the fan being arranged below the grate.

9. The coating device according to claim 7, wherein, as seen looking in the flow direction, a filter is provided upstream of the fan.

10. A coating device according to claim 1, comprising a robot which holds and guides the spraying device and/or the workpiece.

11. A coating device according to claim 1, wherein the flow channel has a round cross-section.

12. A coating device according to claim 1, wherein the flow channel is made of metal or plastic material.

13. A coating device according to claim 1, wherein the spraying device is arranged transversely to the longitudinal axis (LA) of the flow channel.

\* \* \* \* \*